US007168870B2

(12) United States Patent
Sato et al.

(10) Patent No.: US 7,168,870 B2
(45) Date of Patent: Jan. 30, 2007

(54) THERMAL ACTIVATION METHOD AND PROCESSING METHOD FOR HEAT-SENSITIVE ADHESIVE SHEET, AND THERMAL ACTIVATION DEVICE AND PRINTER FOR HEAT-SENSITIVE ADHESIVE SHEET

(75) Inventors: Yoshinori Sato, Chiba (JP); Minoru Hoshino, Chiba (JP); Hiroyuki Kohira, Chiba (JP); Masanori Takahashi, Chiba (JP); Tatsuya Obuchi, Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 11/137,847

(22) Filed: May 25, 2005

(65) Prior Publication Data

US 2005/0271438 A1 Dec. 8, 2005

(30) Foreign Application Priority Data

Jun. 1, 2004 (JP) ............................ 2004-163088

(51) Int. Cl.

| | |
|---|---|
| ***B41J 2/315*** | (2006.01) |
| ***B41J 2/32*** | (2006.01) |
| ***B29C 65/00*** | (2006.01) |
| ***B41F 33/00*** | (2006.01) |

(52) U.S. Cl. ................. 400/120.01; 347/171; 101/483; 156/277

(58) Field of Classification Search ..................... None
See application file for complete search history.

(56) References Cited

U.S. PATENT DOCUMENTS

| | | | | |
|---|---|---|---|---|
| 6,731,319 | B2 * | 5/2004 | Ichikawa et al. | 347/212 |
| 6,885,390 | B2 * | 4/2005 | Hoshino et al. | 347/171 |

FOREIGN PATENT DOCUMENTS

| | | | |
|---|---|---|---|
| EP | 1356948 | | 10/2003 |
| EP | 1486337 | | 12/2004 |
| JP | 2001-096789 | * | 4/2001 |
| JP | 2001-260408 | * | 9/2001 |
| JP | 2003-136772 | * | 5/2003 |

* cited by examiner

*Primary Examiner*—Daniel J. Colilla
*Assistant Examiner*—Marissa Ferguson-Samreth
(74) *Attorney, Agent, or Firm*—Adams & Wilks

(57) ABSTRACT

A thermal activation method for a heat-sensitive adhesive sheet having a front end and a rear end. A heat-sensitive adhesive sheet is conveyed between a thermal head for generating heat and a platen roller by rotating the platen roller against the thermal head to thermally activate the heat-sensitive adhesive sheet. The thermal head is driven to cause the thermal head to generate heat in synchronization with conveyance of the heat-sensitive adhesive sheet by the platen roller so that the thermal head starts generating heat before the front end of the heat-sensitive adhesive sheet enters between the thermal head and the platen roller and while the platen roller rotates less than once between the point at which the thermal head starts generating heat and the point at which the front end of the heat-sensitive adhesive sheet enters between the thermal head and the platen roller.

13 Claims, 5 Drawing Sheets

THERMAL ACTIVATION METHOD AND PROCESSING METHOD FOR HEAT-SENSITIVE ADHESIVE SHEET, AND THERMAL ACTIVATION DEVICE AND PRINTER FOR HEAT-SENSITIVE ADHESIVE SHEET

BACKGROUND OF THE INVENTION

1. Field of the Invention

The present invention relates to a thermal activation method and processing method for a heat-sensitive adhesive sheet, a thermal activation device, and a printer for a heat-sensitive adhesive sheet.

2. Description of the Related Art

Heat-sensitive adhesive sheets with a heat-sensitive adhesive layer that develops adhesion when heated, as those disclosed in JP 11-79152 A and JP 2003-316265 A, have been in practical use for some time now. Such heat-sensitive adhesive sheets have advantages including being easy to handle since the sheets are not adhesive prior to heating and producing no factory wastes since they do not need release paper. A thermal head, which is usually employed as a printing head in a thermal printer, is sometimes used to heat this type of heat-sensitive adhesive sheet and to thereby make its heat-sensitive adhesive layer develop adhesion. This is advantageous particularly when a heat-sensitive adhesive sheet is printable on one side, for thermal heads similar in structure can be used for printing and thermal activation. A common thermal activation device has a thermal head as the one mentioned above, and a platen roller which rotates against the thermal head. A heat-sensitive adhesive sheet is inserted between the thermal head and the platen roller and, during the passage, a heat-sensitive adhesive layer of the sheet is thermally activated from the heat of the thermal head, thus developing adhesion.

In general, when attaching an adhesive sheet to some article, the adhesive sheet, particularly its outer edges, should be stuck solid to the article. As long as the outer edges of the adhesive sheet are glued fast, a loose portion in the middle hardly causes the adhesive sheet to fall off in use and raises no substantial problem. On the other hand, if the outer edges of the adhesive sheet are loose in some places, the adhesive sheet can easily start to peel from those places, which seriously damages the function of the adhesive sheet as well as the reliability of a device or the like that has attached the adhesive sheet.

A conventional solution to this problem is, in the case where a heat-sensitive adhesive sheet is to be thermally activated and develop adhesion from contact with a thermal head which is generating heat, to start driving the thermal head and thereby make the thermal head generate heat before the heat-sensitive adhesive sheet enters between the thermal head and an opposing platen roller, and to stop driving the thermal head and thereby make the thermal head cease generating heat after the heat-sensitive adhesive sheet departs from between the thermal head and the platen roller. This is to accommodate errors of a heat-sensitive adhesive sheet conveying device and of other relevant devices which could cause a heat-sensitive adhesive sheet to move in other manners than intended and fail to enter, or depart from, between the thermal head and the platen roller at a given timing. In other words, this avoids insufficient thermal activation of the front end or rear end of a heat-sensitive adhesive sheet in a sheet conveying direction due to ill-timed heat generation of the thermal head, including cases where the thermal head is not ready to heat the front end upon its arrival at the passage between the thermal head and the platen roller, and cases where the thermal head stops generating heat prior to departure of the rear end from between the thermal head and the platen roller, as well as resultant spots of weak adhesion in the front end or rear end of the heat-sensitive adhesive sheet. Similar drive control to ensure that the front and rear ends of a heat-sensitive adhesive sheet are heated well is executed in the case where the thermal head does not generate enough heat immediately after started up and accordingly needs pre-heating time.

Thus, driving the thermal head longer than a given period in which a heat-sensitive adhesive sheet enters and departs from between the thermal head and the platen roller makes it possible to obtain a highly reliable heat-sensitive adhesive sheet with good adhesion irrespective of some error in conveyance of the heat-sensitive adhesive sheet.

As described, a heat-sensitive adhesive sheet with good adhesion is obtained by the thermal activation method that keeps the thermal head driven longer than a given period in which a heat-sensitive adhesive sheet enters and departs from between the thermal head and the platen roller. A drawback of this method is that, if the heat-sensitive adhesive sheet has a heat-sensitive printable layer besides the heat-sensitive adhesive layer, the printable layer may develop color unintendedly (blurring) from excess heat.

To elaborate, while the thermal head is driven to generate heat prior to arrival of the heat-sensitive adhesive sheet at the passage between the thermal head and the platen roller and while the thermal head remains driven to generate heat after departure of the heat-sensitive adhesive sheet from the passage, the platen roller rotates pressed directly against the thermal head instead of through the heat-sensitive adhesive sheet. Directly heated by the thermal head, the platen roller accumulates heat. When the heat-sensitive adhesive sheet is inserted between the thermal head and the platen roller that has accumulated the heat, the printable layer is heated and develops color through contact with the platen roller and from the accumulated heat on the surface of the platen roller at the same time the heat-sensitive adhesive layer is heated through contact with the thermal head. The surface of the platen roller is often formed from a highly heat-resistant material such as silicone rubber and, because of the low thermal conductance of the material, can keep heat well enough to cause the printable layer to develop color unintendedly.

As has been described, in prior art, a measure to ensure satisfactory thermal activation of the front end of a heat-sensitive adhesive sheet in a sheet conveying direction could result in unintended color development of a printable layer of the heat-sensitive adhesive sheet and a measure to ensure satisfactory thermal activation of the rear end of a heat-sensitive adhesive sheet in a sheet conveying direction could result in unintended color development of a printable layer of the next heat-sensitive adhesive sheet.

SUMMARY OF THE INVENTION

The present invention has been made in view of the above, and an object of the present invention is therefore to provide a thermal activation method and processing method for a heat-sensitive adhesive sheet, a thermal activation device, and a printer for a heat-sensitive adhesive sheet which give a heat-sensitive adhesive sheet high reliability as an adhesive sheet by thorough thermal activation of the heat-sensitive adhesive sheet at both ends in a sheet conveying direction and which avoid heating the heat-sensitive adhesive sheet unnecessarily with heat accumulated in a platen roller.

A thermal activation method for a heat-sensitive adhesive sheet according to the present invention includes the steps of: conveying a heat-sensitive adhesive sheet between a thermal head and a platen roller by rotating the platen roller against the thermal head; and driving the thermal head to make the thermal head generate heat in sync with conveyance of the heat-sensitive adhesive sheet, and is characterized by driving the thermal head in a manner that makes the thermal head start generating heat earlier than a timing at which the front end in the conveying direction of the heat-sensitive adhesive sheet enters between the thermal head and the platen roller by a time period shorter than the one it takes for the platen roller to rotate once.

According to this method, even if the front end of the heat-sensitive adhesive sheet enters between the thermal head and the platen roller earlier than a given timing for some reason, the thermal head has already started generating heat at that point and can give thorough thermal activation to the front end. In addition, the platen roller is set to rotate less than one rotation while being in direct contact with and heated by the thermal head, thereby ensuring that nowhere on the platen roller surface comes into contact with and heated by the thermal head twice. Excessive heat accumulation on the platen roller surface is thus prevented.

Preferably, the thermal head is driven in a manner that makes the thermal head stop generating heat later than a timing at which the rear end of the heat-sensitive adhesive sheet departs from between the thermal head and the platen roller by a time period shorter than the one it takes for the platen roller to rotate once. According to this method, even if the rear end of the heat-sensitive adhesive sheet departs from between the thermal head and the platen roller later than a given timing for some reason, the thermal head remains generating heat past that point and can give thorough thermal activation to the rear end.

The term “timing” here refers to a preset value at which point in time a particular operation is to be carried out, not an actually measured value which varies from one actual operation to another. In other words, a timing here may not quite coincide with actual operation (e.g., entrance of the heat-sensitive adhesive sheet between the thermal head and the platen roller, and departure of the heat-sensitive adhesive sheet from between the thermal head and the platen roller) of relevant members taking place each separate time.

In the case where plural heat-sensitive adhesive sheets are to be thermally activated in succession, it is preferable to control conveyance of the heat-sensitive adhesive sheets in a manner that puts an interval of 0.5 second or more between the thermal head stopping generating heat for a preceding heat-sensitive adhesive sheet and the thermal head starting generating heat for the next heat-sensitive adhesive sheet. This way the platen roller heated during thermal activation of the preceding heat-sensitive adhesive sheet releases heat and cools down sufficiently before heated again from the heat for thermal activation of the next heat-sensitive adhesive sheet. Excessive heat accumulation is thus avoided despite long, continuous thermal activation.

These methods are effective particularly when a heat-sensitive adhesive sheet has a heat-sensitive printable layer beside a heat-sensitive adhesive layer since the methods prevent the printable layer from developing color unintendedly.

A processing method for a heat-sensitive adhesive sheet according to the present invention includes, in addition to the steps of the above-described thermal activation method, a step of printing on a printable layer of the heat-sensitive adhesive sheet.

A thermal activation device for a heat-sensitive adhesive sheet according to the present invention has a thermal head capable of generating heat; a platen roller which rotates against the thermal head; a pull-in device which inserts a heat-sensitive adhesive sheet between the thermal head and the platen roller; and a control device which drives the thermal head in sync with conveyance of the heat-sensitive adhesive sheet by the pull-in device in a manner that makes the thermal head start generating heat earlier than a timing at which the front end in the conveying direction of the heat-sensitive adhesive sheet enters between the thermal head and the platen roller by a time period shorter than the one it takes for the platen roller to rotate once. The control device preferably controls the thermal head in a manner that makes the thermal head stop generating heat later than a timing at which the rear end of the heat-sensitive adhesive sheet departs from between the thermal head and the platen roller by a time period shorter than the one it takes for the platen roller to rotate once.

It is also preferable for the control device to control conveyance of heat-sensitive adhesive sheets in a manner that puts an interval of 0.5 second or more between the thermal head stopping generating heat for a preceding heat-sensitive adhesive sheet and the thermal head starting generating heat for the next heat-sensitive adhesive sheet.

With these structures, the thermal activation method described above can readily be carried out. This thermal activation device is effective particularly when a heat-sensitive adhesive sheet has a heat-sensitive printable layer beside a heat-sensitive adhesive layer since the methods prevent the printable layer from developing color unintendedly. In this case, a printer for a heat-sensitive adhesive sheet is preferably composed of the thermal activation device and a printing device that prints on the printable layer by heating the printable layer.

According to the present invention, the front and rear ends of a heat-sensitive adhesive sheet in a conveying direction can receive thorough thermal activation and thus the reliability of the heat-sensitive adhesive sheet is enhanced. In addition, the present invention prevents the platen roller from accumulating excessive heat and thereby avoids any influence of heat accumulation over a heat-sensitive adhesive sheet, in particular, unintended color development of a printable layer if the heat-sensitive adhesive sheet has a heat-sensitive printable layer beside a heat-sensitive adhesive layer.

According to the present invention, when plural heat-sensitive adhesive sheets are to be thermally activated in succession, an interval of 0.5 second or more is put between the thermal head stopping generating heat for a preceding heat-sensitive adhesive sheet and the thermal head starting generating heat for the next heat-sensitive adhesive sheet. This way the platen roller releases heat and cools down sufficiently every time thermal activation is completed for one heat-sensitive adhesive sheet, and excessive heat accumulation is thus avoided despite long, continuous thermal activation.

DETAILED DESCRIPTION OF THE PREFERRED EMBODIMENT

An embodiment of the present invention will be described below with reference to accompanying drawings.

First Embodiment

Figure 1:
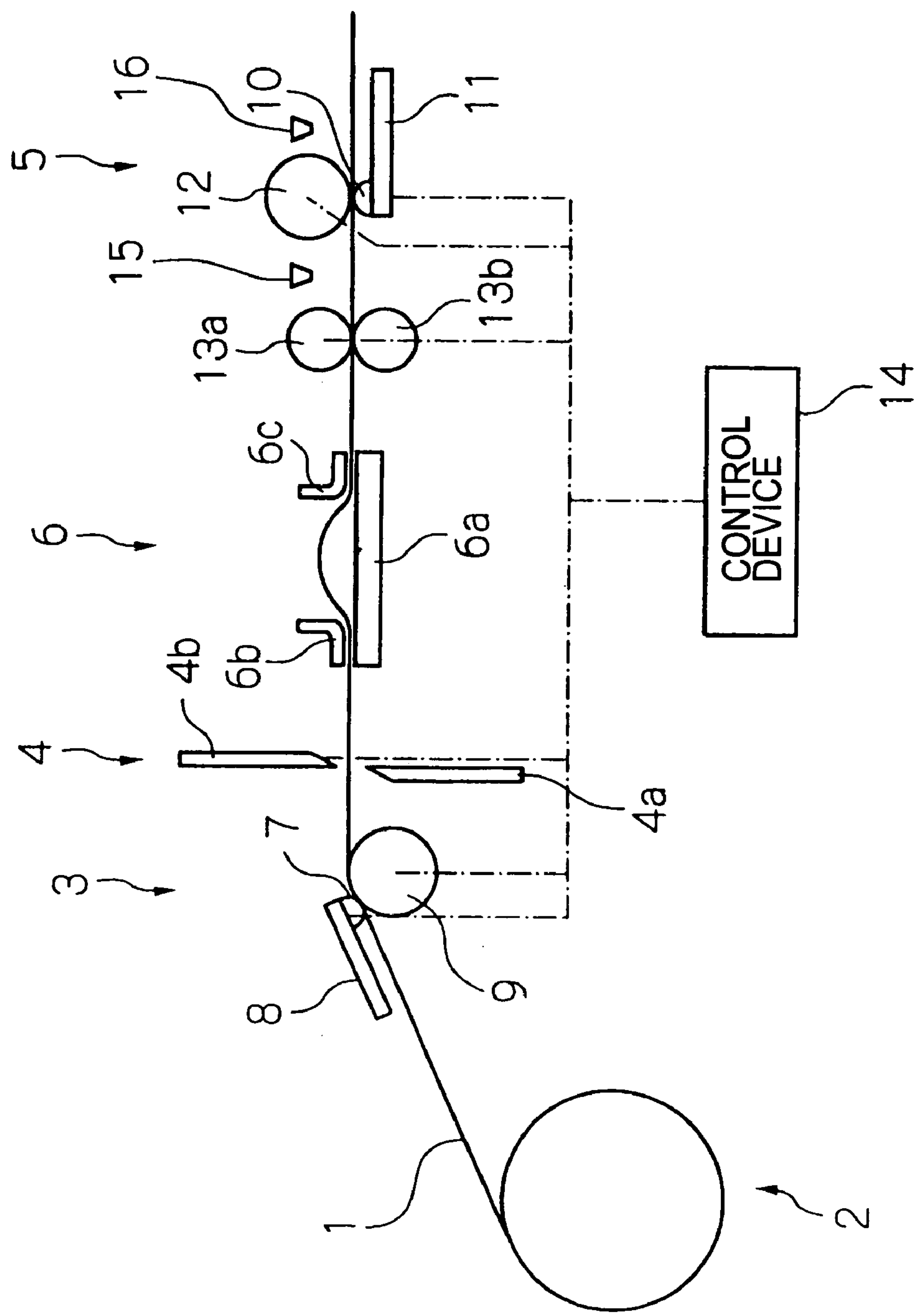
FIG. 1 is a schematic diagram showing the basic structure of a printer for a heat-sensitive adhesive sheet in which a thermal activation device of the present invention is incorporated.

A brief description will be given first on the basic structure of a printer for a heat-sensitive adhesive sheet in which a thermal activation device of this embodiment is incorporated. As schematically shown in FIG. 1, this printer for a heat-sensitive adhesive sheet is composed of a roll housing unit 2 for holding a heat-sensitive adhesive sheet 1 that is wound into a roll; a printing unit (printing device) 3 for printing on a printable layer 1*d* (see FIG. 2) of the heat-sensitive adhesive sheet 1; a cutter unit 4 for cutting the heat-sensitive adhesive sheet 1 into a given length; a thermal activation unit 5 which thermally activates a heat-sensitive adhesive layer 1*a* (see FIG. 2) of the heat-sensitive adhesive sheet 1 and which constitutes the main part of the thermal activation device of this embodiment; a guide unit 6 for guiding the heat-sensitive adhesive sheet 1 along a path from the cutter unit 4 to the thermal activation unit 5; and other components. While in practice the heat-sensitive adhesive sheet 1 is cut by the cutter unit 4 into a short, label-like piece, which is then conveyed to the downstream of the cutter unit 4, FIG. 1 shows the heat-sensitive adhesive sheet 1 in a long and uncut state downstream of the cutter unit 4 for easy understanding of the path along which the heat-sensitive adhesive sheet 1 is conveyed.

Figure 2:
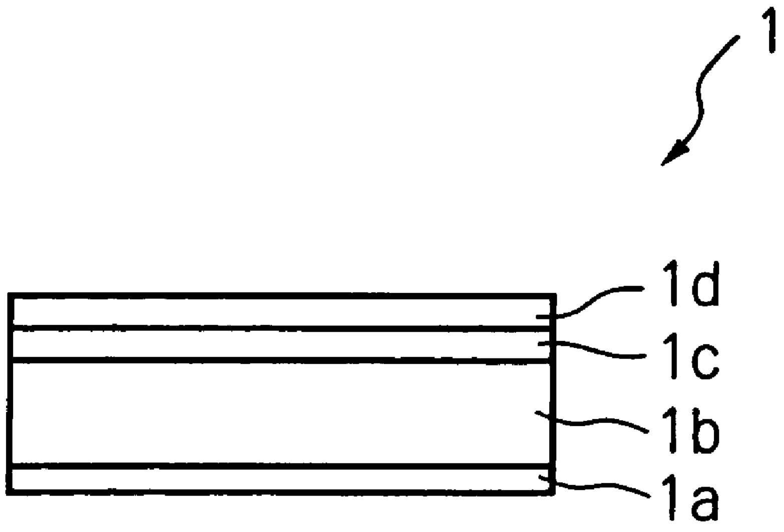
FIG. 2 is an enlarged side view showing an example of a heat-sensitive adhesive sheet used in the present invention.

The heat-sensitive adhesive sheet 1 used in this embodiment is composed of, for example, as shown in FIG. 2, a substrate 1*b* having a heat insulating layer 1*c* and a heat-sensitive color-developing layer (printable layer) 1*d* on the front side and a heat-sensitive adhesive layer 1*a* on the back side. The heat-sensitive adhesive layer 1*a* is obtained by applying a heat-sensitive adhesive agent that has thermoplastic resin, solid plastic resin or the like as its main ingredient, and drying the agent until it solidifies. However, the heat-sensitive adhesive sheet 1 is not limited to this structure and various modifications can be made as long as the heat-sensitive adhesive sheet 1 has the heat-sensitive adhesive layer 1*a*. For instance, a heat-sensitive adhesive sheet employable as the heat-sensitive adhesive sheet 1 may not have the heat insulating layer 1*c*, or may have a protective layer or a colored printed layer (a layer on which letters, images and the like are printed in advance) on the surface of the printable layer 1*d*, or may have a thermal coating.

The printing unit 3 is composed of a printing thermal head 8 having plural heating elements 7 which are relatively small resistors arranged in the width direction (a direction vertical to FIG. 1) for dot printing, a printing platen roller 9 pressed against the printing thermal head 8, and other components. The heating elements 7 can have the structure of heating elements for a printing head of known thermal printers, for example, a structure in which a protective film made of crystallized glass covers the surfaces of plural heating resistors formed on a ceramic substrate or the like with the use of thin film technologies, and therefore a detailed description on the heating elements 7 will be omitted here. The printing thermal head 8 is positioned to come into contact with the printable layer 1*d* of the heat-sensitive adhesive sheet 1. The printing platen roller 9 is pressed against the printing thermal head 8.

The cutter unit 4 is for cutting the heat-sensitive adhesive sheet 1, on which the printing unit 3 has printed, into a given length. The cutter unit 4 is composed of a movable blade 4*a* operated by a driving source (omitted from the drawing), a stationary blade 4*b* opposing the movable blade 4*a*, and other components.

The guide unit 6 is composed of a plate-like guide (first guide) 6*a* placed under a conveying path from the cutter unit 4 to the thermal activation unit 5, and a pair of second guides 6*b* and 6*c* placed at a forwarding portion of the cutter unit 4 and an insertion portion of the thermal activation unit 5, respectively. The second guides 6*b* and 6*c* are bent upward substantially at right angles. The guide unit 6 leads the heat-sensitive adhesive sheet 1 into the thermal activation unit 5 smoothly, and also holds the heat-sensitive adhesive sheet 1 in a temporarily sagged state downstream of the cutter unit 4 to enable the cutter 4 to cut the heat-sensitive adhesive sheet 1 into a desired length.

The thermal activation unit 5 has a thermal activation thermal head 11 with plural heating elements 10 lined up in the width direction, and a thermal activation platen roller 12. The thermal activation thermal head 11 has the same structure as that of the printing thermal head 8, namely, the structure of a printing head of known thermal printers including one in which a protective film made of crystallized glass covers the surfaces of plural heating resistors formed on a ceramic substrate. With the thermal activation thermal head 11 having the structure of the printing thermal head 8, the thermal heads 11 and 8 can share parts and thus the cost can be reduced. Another advantage is that, having many small heating elements (heating resistors) 10, the thermal activation thermal head 11 is capable of heating a large surface area evenly with ease compared to a single (or a very few), large heating element. The thermal activation thermal head 11 faces the opposite direction from the printing thermal head 8, and is positioned to come into contact with the heat-sensitive adhesive layer 1*a* of the heat-sensitive adhesive sheet 1. The thermal activation platen roller 12 is pressed against the thermal activation thermal head 11. An entrance detecting sensor 15 and a discharge detecting sensor 16 which are capable of detecting the presence or absence of the heat-sensitive adhesive sheet 1 are located upstream and downstream of the thermal activation unit 5, respectively. The entrance detecting sensor 15 and the discharge detecting sensor 16 can be known photo sensors which have light receiving elements and light emitting elements.

A pair of pull-in rollers (pull-in device) 13*a* and 13*b* for reeling in a piece of the heat-sensitive adhesive sheet 1 that has been cut by the cutter unit 4 is provided upstream of the thermal activation thermal head 11. The pull-in rollers 13*a* and 13, the printing platen roller 9, and the thermal activation platen roller 12 constitute a conveying device which conveys the heat-sensitive adhesive sheet 1 throughout the printer for a heat-sensitive adhesive sheet.

The printer for a heat-sensitive adhesive sheet also has a control device 14, which is schematically shown in FIG. 1. The control device 14 drives the conveying device (the rollers 13*a*, 13*b*, 9 and 12), the movable blade 4*b*, the printing thermal head 8, the thermal activation head 11, and other components of the printer, and controls the operation of these components. The control device 14 drives the conveying device and the printing thermal head in synchronization (hereinafter "in sync") with each other to alternately convey and print on the heat-sensitive adhesive sheet 1 until the heat-sensitive adhesive sheet 1 is printed on for its entire length. The control device 14 drives the thermal activation thermal head 11 in sync with the conveying device at a timing described above to carry out a thermal activation method of the present invention.

Given below is a brief description on the basic steps of a method of creating a desired adhesive label or the like from the heat-sensitive adhesive sheet 1 with the use of the thus structured printer for a heat-sensitive adhesive sheet (a processing method for the heat-sensitive adhesive sheet 1).

First, the heat-sensitive adhesive sheet 1 pulled out of the roll housing unit 2 is inserted between the printing thermal head 8 and platen roller 9 of the printing unit 3. With a supply of a print signal from the control device 14 to the printing thermal head 8, the plural heating elements 7 of the printing thermal head 8 are selectively driven at an appropriate timing to generate heat and print on the printable layer 1*d* of the heat-sensitive adhesive sheet 1. In sync with the driving of the printing thermal head 8, the platen roller 9 is driven and rotated to convey the heat-sensitive adhesive sheet 1 in a direction intersecting the direction in which the heating elements of the printing thermal head 8 are aligned, for example, the sheet is conveyed in a direction perpendicular to the array of the heating elements 7. Specifically, one line of printing by the printing thermal head 8 and conveyance of the heat-sensitive adhesive sheet 1 by the platen roller 9 by a given amount (one line, for example) are alternated to print predetermined letters, images and the like on the heat-sensitive adhesive sheet 1.

The heat-sensitive adhesive sheet 1 thus printed on passes between the movable blade 4*a* and stationary blade 4*b* of the cutter unit 4 and then reaches the guide unit 6. In the guide unit 6, the heat-sensitive adhesive sheet 1 is bowed as necessary to set the length of the heat-sensitive adhesive sheet 1 from its front end in the conveying direction to the point between the movable blade 4*a* and stationary blade 4*b* of the cutter unit 4. For instance, in the case where the length of an adhesive label to be created is longer than the shortest distance from the pull-in rollers 13*a* and 13*b* to the movable blade 4*a* and stationary blade 4*b* of the cutter unit 4, the rotation of the pull-in rollers 13*a* and 13*b* is halted and the platen roller 9 is rotated with the front end in the conveying direction of the heat-sensitive adhesive sheet 1 held between the stilled rollers 13*a* and 13*b*. This allows the heat-sensitive adhesive sheet 1 to bow in the guide unit 6 until the length of the heat-sensitive adhesive sheet 1 from its front end in the conveying direction to the point between the movable blade 4*a* and stationary blade 4*b* of the cutter unit 4 becomes equal to the length of the label to be created. Then the movable blade 4*a* is driven to cut the heat-sensitive adhesive sheet 1.

Next, the paired pull-in rollers 13*a* and 13*b* are rotated to send, to the thermal activation unit 5, the label-like piece of the heat-sensitive adhesive sheet 1 that has been printed on as necessary and cut into a given length in the manner described above. The control device 14 drives the thermal activation thermal head 11 while the label-like piece of the heat-sensitive adhesive sheet 1 is held between the thermal activation thermal head 11 and the platen roller 12 in the thermal activation unit 5. The heat-sensitive adhesive layer 1*a* in contact with the thermal activation thermal head 11 is thus heated and activated. The rotation of the platen roller 12 forwards the label-like piece of the heat-sensitive adhesive sheet 1 with the entire surface of the heat-sensitive adhesive layer 1*a* pressed against the thermal activation thermal head 11 until the label passes the thermal activation thermal head 11. As a result of taking into consideration the driving time of the heating elements 10 that is necessary for thorough thermal activation of one point of the heat-sensitive adhesive sheet 1 and the moving speed of the heat-sensitive adhesive sheet 1 relative to the heating elements 10, the heat-sensitive adhesive sheet 1 is moved continuously when the driving time of the heating elements 10 is short whereas the heat-sensitive adhesive sheet 1 is moved intermittently, line by line, when the driving time of the heating elements 10 is long. The timing at which the heating elements 10 of the thermal activation thermal head 11 are driven, which is a major feature of this embodiment, will be described later.

In this way, a given length of adhesive label having predetermined letters, images and the like printed one side and having developed adhesion on the other side is created from the heat-sensitive adhesive sheet 1.

According to the present invention, in the thermal activation of the heat-sensitive adhesive sheet 1, the control device 14 drives the thermal activation thermal head 11 in sync with conveyance of the heat-sensitive adhesive sheet 1 by the platen roller 12 in a manner that makes the thermal activation thermal head 11 start generating heat earlier than a given timing at which the front end in the conveying direction of the heat-sensitive adhesive sheet 1 enters between the thermal activation thermal head 11 and the platen roller 12 by a time period shorter than the one it takes for the platen roller 12 to rotate once and in a manner that makes the thermal activation thermal head 11 stop generating heat later than a given timing at which the rear end of the heat-sensitive adhesive sheet departs from between the thermal activation thermal head 11 and the platen roller 12 by a time period shorter than the one it takes for the platen roller 12 to rotate once.

Figure 3:
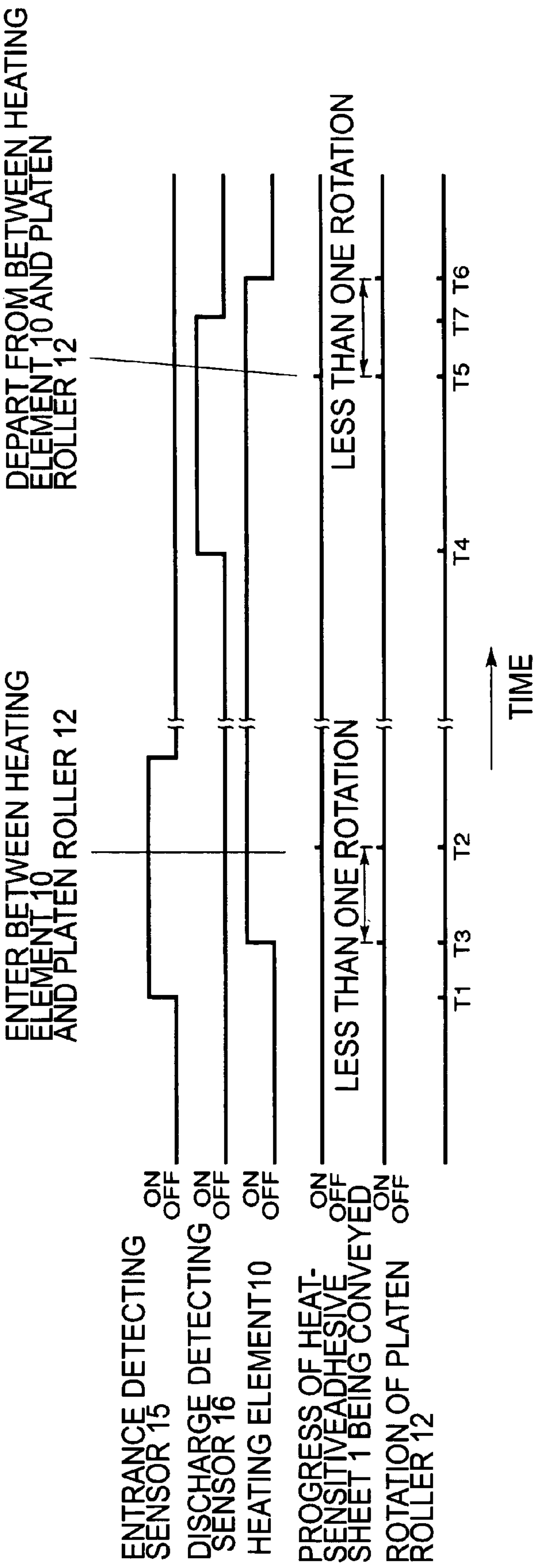
FIG. 3 is a time chart showing a thermal activation method of the present invention.

A specific description will be given on this thermal activation method with reference to a timing chart shown in FIG. 3. First, at a timing T1, the entrance detecting sensor 15 upstream of the thermal activation unit 5 detects the front end of the heat-sensitive adhesive sheet 1. A timing T2 at which the front end of the heat-sensitive adhesive sheet 1 enters between the heating elements 10 and the platen roller 12 is obtained from the distance between the entrance detecting sensor 15 and the heating elements 10 of the thermal head 11 and from the speed at which the heat-sensitive adhesive sheet 1 is being conveyed. The control device 14 starts driving the heating elements 10 is set such that a time period from the start of driving of the heating elements 10 (T3) to the arrival of the leading or front end of the heat-sensitive adhesive sheet 1 at the passage between the heating elements 10 and the platen roller 12 (T2) is shorter than the one it takes for the platen roller 12 to rotate once. In other words, the driving timing is set such that the platen roller 12 rotates less than once between the timing T3 at which driving of the heating elements 10 is started and the timing T2 at which the front end of the heat-sensitive adhesive sheet 1 enters between the heating elements 10 and the platen roller 12. Stated otherwise, the control device drives the thermal head 11 to cause the thermal head 11 to generate heat in synchronization with conveyance of the heat-sensitive adhesive sheet 1 by the platen roller 12 so that the thermal head 11 starts generating heat before the front end of the heat-sensitive adhesive sheet 1 enters between the thermal head 11 and the platen roller 12 and while the platen roller 12 rotates less than once between the point at which the thermal head 11 starts generating heat and the point at which the front end of the heat-sensitive adhesive sheet 1 enters between the thermal head 11 and the platen roller 12.

When the heat-sensitive adhesive sheet 1 is about to be discharged after thermal activation by the thermal head 11 is completed, the discharge detecting sensor 16 downstream of the thermal activation unit 5 detects the front end of the heat-sensitive adhesive sheet 1 at a timing T4. A timing T5 at which the rear end of the heat-sensitive adhesive sheet 1 departs from between the heating elements 10 and the platen roller 12 is obtained from the distance between the discharge detecting sensor 16 and the heating elements 10 of the thermal head 11 and from the length and conveying speed of the heat-sensitive adhesive sheet 1. The controle device 14 stops driving the heating elements 10 after the timing T5 to make the heating elements 10 cease generating heat. At this point, the timing of driving the heating elements 10 is set such that a time period from departure of the rear end of the heat-sensitive adhesive sheet 1 from between the heating elements 10 and the platen roller 12 (T5) to the end of driving of the heating elements 10 (T6) is shorter than the one it takes for the platen roller 12 to rotate once. In other words, the driving timing is set such that the platen roller 12 rotates less than once between the timing T5 at which the trailing or rear end of the heat-sensitive adhesive sheet 1 departs from between the heating elements 10 and the platen roller 12 and the timing T6 at which driving of the heating elements 10 is stopped. Stated otherwise, the control device 14 controls the thermal head 11 so that the thermal head 11 stops generating heat after the rear end of the heat-sensitive adhesive sheet 1 departs from between the thermal head 11 and the platen roller 12 and while the platen roller 12 rotates less than once between the point at which the thermal head 11 stops generating heat and the point at which the rear end of the heat-sensitive adhesive sheet 1 departs from between the thermal head 11 and the platen roller 12. Although the timing T5 is calculated in the above decription from the timing T4 at which the discharge detecting sensor 16 detects the front end of the heat-sensitive adhesive sheet 1, it is also possible to calculate back the timing T5 from a timing T7 at which the discharge detecting sensor 16 detects the passage of the rear end of heat-sensitive adhesive sheet 1.

According to this embodiment, driving (heat generation) of the heating elements 10 is started before the front end of the heat-sensitive adhesive sheet 1 enters between the heating elements 10 and the platen roller 12. This ensures that the heating elements 10 are ready to give the front end of the heat-sensitive adhesive sheet 1 thorough thermal activation as the front end comes into contact with the heating elements 10. Even if some error causes the front end of the heat-sensitive adhesive sheet 1 to enter between the heating elements 10 and the platen roller 12 earlier than a given timing, heat generation has been started at that point and the front end can be thermally activated. Similarly, driving (heat generation) of the heating elements 10 is continued after the rear end of the heat-sensitive adhesive sheet 1 departs from between the heating elements 10 and the platen roller 12. Even if some error causes the rear end of the heat-sensitive adhesive sheet 1 to depart from between the heating elements 10 and the platen roller 12 later than a given timing, the heating elements 10 is still generating heat at that point and the rear end can be thermally activated.

Also, this embodiment prevents the platen roller 12 from accumulating heat by limiting the time period in which the heating elements 10 are driven to generate heat before the front end of the heat-sensitive adhesive sheet 1 enters between the heating elements 10 and the platen roller 12 to a length shorter than it takes for the platen roller 12 to rotate once.

Heat accumulation of the platen roller 12 will be described. If the platen roller 12 rotates once or more while heated from direct contact with the heating elements 10 before entrance of the front end of the heat-sensitive adhesive sheet 1 between the heating elements 10 and the platen roller 12, some portions on the surface of the platen roller 12 come into direct contact with the heating elements 10 and heated twice, resulting in a significant amount of heat accumulation. Upon subsequent entrance of the front end of the heat-sensitive adhesive sheet 1 between the heating elements 10 and the platen roller 12, one side (the heat-sensitive adhesive layer 1*a*) of the heat-sensitive adhesive sheet 1 comes into contact with the heating elements 10 to be heated and thermally activated and, at the same time, the other side (the printable layer 1*d*) of the heat-sensitive adhesive sheet 1 comes into contact with the platen roller 12 whose temperature has been raised by the heat accumulation and develops color unintendedly (blurring) from the heat. Blurring easily takes place since the thermal activation thermal head 11 which is for thermal activation of the heat-sensitive adhesive layer 1*a* is driven with about twice more energy than used to drive the printing thermal head 8 which is for printing on the printable layer 1*d* and the printable layer 1*d* reacts to less heat energy than the heat-sensitive adhesive layer 1*a* does. To avoid blurring, this embodiment sets the platen roller 12 to rotate less than once while the platen roller 12 is directly in contact with the heating elements 10 and could be heated by the heating elements 10, and thus eliminates the possibility of heating some places on the surface of the platen roller 12 twice from direct contact with the heating elements 10. With a usual platen roller material (e.g., silicone rubber) and under normal driving conditions of the thermal activation thermal head 11, heat held on the surface of the platen roller 12 from one direct contact with the heating elements 10 is not enough to cause blurring on the printable layer 1*d* of the next heat-sensitive adhesive sheet 1 upon contact between the printable layer 1*d* and the platen roller 12.

This embodiment also limits the time period in which the heating elements 10 remains driven to generate heat after the rear end in the conveying direction of the heat-sensitive adhesive sheet 1 departs from between the heating elements 10 and the platen roller 12 to a length shorter than it takes for the platen roller 12 to rotate once. This is for, similar to the reason described above, eliminating the possibility of heating some places on the surface of the platen roller 12 twice from direct contact with the heating elements 10. Since excessive heat accumulation of the platen roller 12 is thus avoided, blurring can be avoided as the printable layer 1*d* of the next heat-sensitive adhesive sheet 1 is brought into contact with the platen roller 12. However, from the viewpoint of energy efficiency, it is preferable to stop driving the thermal activation thermal head 11 as soon as departure of the rear end of the heat-sensitive adhesive sheet 1 from between the heating elements 10 and the platen roller 12 is confirmed. The major point of this embodiment is, while accommodating some error that causes the rear end of the heat-sensitive adhesive sheet 1 to pass the thermal activation thermal head later than a given timing by keeping driving the thermal activation thermal head after the given timing, in preventing excessive heat accumulation of the platen roller 12 by setting an upper limit to how long the thermal activation thermal head is kept driven after the given timing in a manner that allows the platen roller 12 to rotate less than once when in direct contact with the heating elements that are generating heat.

As has been described, the present invention makes it possible to avoid blurring on a heat-sensitive printable layer. For instance, in the case where bar code is to be printed on a heat-sensitive adhesive sheet, a clear bar code can be printed which has no fear of reading error due to unintended color development (blurring)

Figure 4:
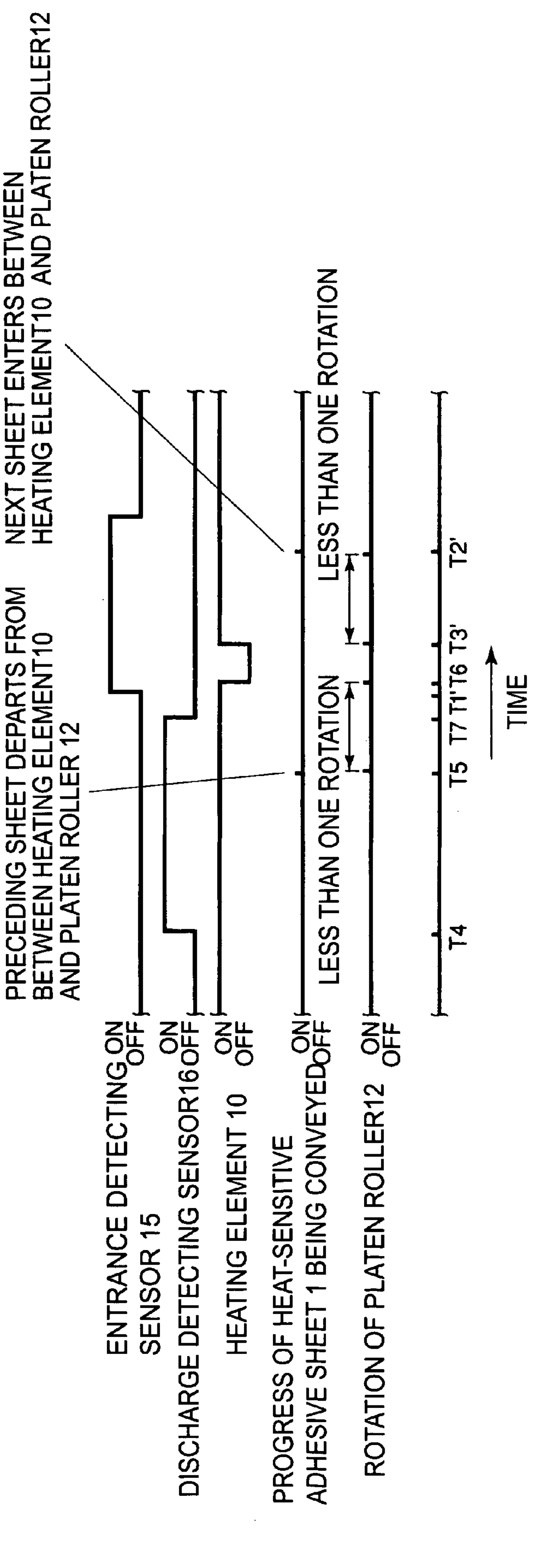
FIG. 4 is a time chart showing a thermal activation method of a comparative example.

The above description basically deals with printing and thermal activation of one sheet of the heat-sensitive adhesive sheet 1. However, the thermal activation unit 5 of the printer for a heat-sensitive adhesive sheet shown in FIG. 1 is capable of successive thermal activation of plural label-like pieces of the heat-sensitive adhesive sheet 1 that have been printed on and cut intoa given length. In this case, as shown in FIG. 4, the front end of one of the label-like pieces in a conveying direction of the heat-sensitive adhesive sheet 1 enters between the thermal activation thermal head 11 and the platen roller 12 (T2') as soon as the rear end of a preceding label-like piece of the heat-sensitive adhesive sheet 1 departs from between the thermal activation thermal head 11 and the platen roller 12 (T5). Then driving the thermal activation thermal head 11 at the timing described above results in almost continuous heating of the platen roller 12 and could lead to blurring by heat accumulation. In other words, in FIG. 4, the time interval is very short between the timing T6 at which driving (heat generation) of the heating elements 10 is started for thermal activation of the next piece of the heat-sensitive adhesive sheet 1 (T3'–T6). The platen roller 12 which, at this points, is in direct contact with the heating elements 10, therefore does not have enough time to cool down before being heated again. Given no heat releasing period for cooling down, the platen roller 12 accumulates more and more heat as many pieces of the heat-sensitive adhesive sheet 1 are thermally activated in succession, and ever increases the risk of blurring.

Figure 5:
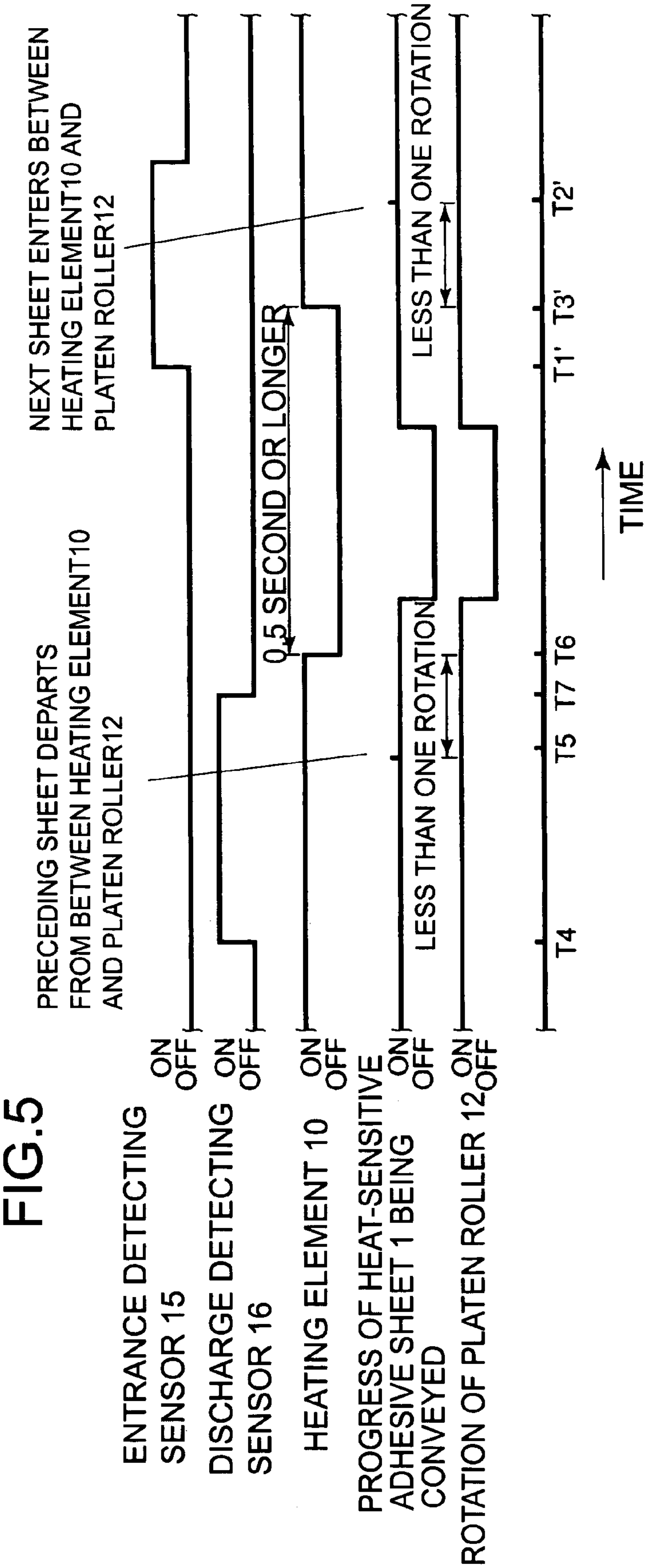
FIG. 5 is another time chart showing the thermal activation method of the present invention.

This embodiment solves the problem by setting the (T3'–T6) interval to 0.5 second or longer as shown in FIG. 5. The (T3'–T6) interval is the interval between the end of driving (heat generation) of the thermal activation thermal head 11 (T6) after the rear end of the preceding piece of the heat-sensitive adhesive sheet 1 departs from between the thermal activation thermal head 11 and the platen roller 12 (T5) and the start of driving (heat generation) of the thermal activation thermal head 11 (T3') before the front end of the next piece of the heat-sensitive adhesive sheet 1 enteres between the thermal activation thermal head 11 and the platen roller 12 (T2'). The platen roller 12 heated from direct contact with the heating elements 10 after the departure of the rear end of the preceding piece of the heat-sensitive adhesive sheet 1 is thus allowed to release enough heat through, for example, a not-shown metal axis. Given 0.5 second of heat releasing time or longer, the platen roller 12 can cool down after each thermal activation step, and the possibility of blurring can be kept low despite long, successive thermal activation.

The entrance detecting sensor 15 and the discharge detecting sensor 16 in the above description are used only to set the driving timing of the heating elements 10 of the thermal activation thermal head 11. The sensors may also be utilized for drive control over the conveying device (the pull-in rollers 13*a* and 13*b* and the platen rollers 9 and 12) of the heat-sensitive adhesive sheet 1 and the cutter unit 4. It is also possible to omit one or both of the entrance detecting sensor 15 and the discharge detecting sensor 16. In this case, operation start signals and operation end signals of the rollers can be used in place of detection signals of the sensors 15 and 16. Alternatively, the timing of driving the heating elements 10 of the thermal activation thermal head 11 maybe calculated in advance from the speed at which the heat-sensitive adhesive sheet 1 is conveyed by the conveying device, the length of the heat-sensitive adhesive sheet 1, the size and rotation speed of the platen roller 12, or the like to drive the heating elements 10 in accordance with the calculation result. Driving the heating elements in accordance with the result of an advance calculation provides processing mostly as desired since the present invention is capable of thorough thermal activation irrespective of some error during conveyance.

As has been described, in the present invention, the thermal activation thermal head 11 is kept driven, before the front end of the heat-sensitive adhesive sheet 1 in a conveying direction arrives at the thermal activation thermal head 11 and after the rear end of the heat-sensitive adhesive sheet 1 departs from the thermal activation thermal head 11, for a time period shorter than it takes for the platen roller 12 to rotate once. This can be achieved with a device that has substantially the same structure as conventional thermal activation devices by making appropriate changes on the timing of operations controlled by the control device and by modifying the conveying speed of the heat-sensitive adhesive sheet 1 and the rotation speed of the rollers appropriately. Another way to achieve this is a structural change such as increasing the diameter of the platen roller 12, or cutting short the conveying path of the heat-sensitive adhesive sheet 1 throughout the entire printer (including the distance from the pull-in rollers 13*a* and 13*b* to the thermal activation thermal head 11.

The present invention sets an upper limit to how long the thermal activation thermal head is driven before the front end in the conveying direction of the heat-sensitive adhesive sheet 1 arrives at the thermal activation thermal head 11 and after the rear end of the heat-sensitive adhesive sheet 1 departs from the thermal activation thermal head 11 (for a time period shorter than it takes for the platen roller 12 to rotate once). On the other hand, the lower limit of the driving time cannot be determined singularly but is influenced by the precision of each device, the rise performance of the thermal activation thermal head 11 after the start of the driving. Therefore, the lower limit is appropriately set for each apparatus taking into account the influence.

The overall structure of the printer for a heat-sensitive adhesive sheet is not limited to the one shown in FIG. 1 in accordance with the embodiment, and can receive various modifications. For instance, the printing unit 3, the cutter unit 4, and the guide unit 6 may be placed downstream of the thermal activation unit 5. The guide unit 6 may be omitted. The positions of the entrance detecting sensor 15 and the discharge detecting sensor 16 can be changed arbitrarily. In particular, control is made easier if the distance from the entrance detecting sensor 15 and the discharge detecting sensor 16 to the thermal activation thermal head 11 is set such that the heat-sensitive adhesive sheet 1 moves the distance at a given conveying speed within a time period shorter than it takes for the platen roller 12 to rotate once.

The present invention is effective also when the heat-sensitive adhesive sheet 1 does not have a printable layer but is affected in some other way than development of adhesion by heat.

What is claimed is:

1. A thermal activation method for a heat-sensitive adhesive sheet having a front end and a rear end, comprising the steps of:

conveying the heat-sensitive adhesive sheet between a thermal head for generating heat and a platen roller by rotating the platen roller against the thermal head to thermally activate the heat-sensitive adhesive sheet; and driving the thermal head to cause the thermal head to generate heat in synchronization with conveyance of the heat-sensitive adhesive sheet by the platen roller so that the thermal head starts generating heat before the front end of the heat-sensitive adhesive sheet enters between the thermal head and the platen roller and while the platen roller rotates less than once between the point at which the thermal head starts generating heat and the point at which the front end of the heat-sensitive adhesive sheet enters between the thermal head and the platen roller.

2. A thermal activation method for a heat-sensitive adhesive sheet according to claim 1; wherein the driving step includes the step of driving the thermal head so that the thermal head stops generating heat after the rear end of the heat-sensitive adhesive sheet departs from between the thermal head and the platen roller and while the platen roller rotates less than once between the point at which the thermal head stops generating heat and the point at which the rear end of the heat-sensitive adhesive sheet departs from between the thermal head and the platen roller.

3. A thermal activation method for a plurality of heat-sensitive adhesive sheets, comprising the steps of: thermally activating in succession each of the plurality of heat-sensitive adhesive sheets according to the steps in the method of claim 1; and controlling conveyance of the heat-sensitive adhesive sheets so that there is an interval of 0.5 second or more between the thermal head stopping the generation of heat for one of the heat-sensitive adhesive sheets and the thermal head starting the generation of heat for an immediately successive heat-sensitive adhesive sheet.

4. A thermal activation method for a heat-sensitive adhesive sheet according to claim 1; wherein the heat-sensitive adhesive sheet has a heat-sensitive adhesive layer subjected to the thermal activation and a heat-sensitive printable layer.

5. A processing method for a heat-sensitive adhesive sheet having a heat-sensitive adhesive layer and a heat-sensitive printable layer, comprising the steps of: printing on the heat-sensitive printable layer of the heat-sensitive adhesive sheet; and thermally activating the heat-sensitive adhesive layer of the heat-sensitive adhesive sheet by the steps in the thermal activation method set forth in claim 1.

6. A thermal activation device for a heat-sensitive adhesive sheet,9 the thermal activation device comprising:

a thermal head for generating heat;

a platen roller for undergoing rotation against the thermal head;

a pull-in device for conveying a heat-sensitive adhesive sheet having a front end and a rear end to position the heat-sensitive adhesive sheet between the thermal head and the platen roller; and a control device for controlling the thermal head in synchronization with conveyance of the heat-sensitive adhesive sheet by the pull-in device so that the thermal head starts generating heat before the front end of the heat-sensitive adhesive sheet enters between the thermal head and the platen roller and while the platen roller rotates less than once between the point at which the thermal head starts generating heat and the point at which the front end of the heat-sensitive adhesive sheet enters between the thermal head and the platen roller.

7. A thermal activation device for a heat-sensitive adhesive sheet according to claim 6; wherein the control device controls the thermal head so that the thermal head stops generating heat after the rear end of the heat-sensitive adhesive sheet departs from between the thermal head and the platen roller and while the platen roller rotates less than once between the point at which the thermal head stops generating heat and the point at which the rear end of the heat-sensitive adhesive sheet departs from between the thermal head and the platen roller.

8. A thermal activation device for a heat-sensitive adhesive sheet according to claim 6; wherein the heat-sensitive adhesive sheet comprises a first heat-sensitive adhesive sheet; and wherein the control device controls the successive conveyance of the first heat-sensitive adhesive sheet and at least a second heat-sensitive adhesive sheet so that there is an interval of 0.5 second or more between the thermal head stopping the generation heat for the first heat-sensitive adhesive sheet and the thermal head starting the generation of heat for the second heat-sensitive adhesive sheet.

9. A thermal activation device for a heat-sensitive adhesive sheet according to claim 6; wherein the heat-sensitive adhesive sheet has a heat-sensitive printable layer and a heat-sensitive adhesive layer.

10. A printer for a heat-sensitive adhesive sheet, the printer comprising: a thermal activation device according to claim 9 for thermally activating the heat-sensitive adhesive layer of the heat-sensitive adhesive sheet; and a printing device for printing on the heat-sensitive printable layer of the heat-sensitive adhesive sheet by heating the heat-sensitive printable layer.

11. A printer comprising:

a printing unit for printing during a printing operation on a printable surface of a thermally sensitive adhesive sheet having a thermally sensitive adhesive layer formed on a surface opposite to the printable surface, a leading edge, and a trailing edge opposite the leading edge;

a thermal activation unit for heating the thermally sensitive adhesive layer of the thermally sensitive adhesive sheet, the thermal activation unit having a thermal head for generating heat and a platen roller for undergoing rotation against the thermal head;

a conveying device for conveying the thermally sensitive adhesive sheet between the thermal head and the platen roller; and a control device for controlling the thermal head in synchronization with conveyance of the thermally sensitive adhesive sheet by the conveying device so that the thermal head starts generating heat before the leading edge of the thermally sensitive adhesive sheet enters between the thermal head and the platen roller and while the platen roller rotates less than once between the point at which the thermal head starts generating heat and the point at which the leading edge of the thermally sensitive adhesive sheet enters between the thermal head and the platen roller.

12. A printer according to claim 11; wherein the control device controls the thermal head so that the thermal head stops generating heat after the trailing edge of the thermally sensitive adhesive sheet exits from between the thermal head and the platen roller and while the platen roller rotates less than once between the point at which the thermal head stops generating heat and the point at which the trailing edge of the thermally sensitive adhesive sheet exits from between the thermal head and the platen roller.

13. A printer according to claim 11; wherein the thermally sensitive adhesive sheet comprises a first thermally sensitive adhesive sheet; and wherein the control device controls the successive conveyance of the first thermally sensitive adhesive sheet and at least a second thermally sensitive adhesive sheet so that there is an interval of 0.5 second or more between the thermal head stopping the generation heat for the first thermally sensitive adhesive sheet and the thermal head starting the generation of heat for the second thermally sensitive adhesive sheet.

* * * * *